Feb. 5, 1963
L. B. WHITE
3,076,319
REFRIGERATION CHARGING APPARATUS
Filed Feb. 13, 1961
2 Sheets-Sheet 1
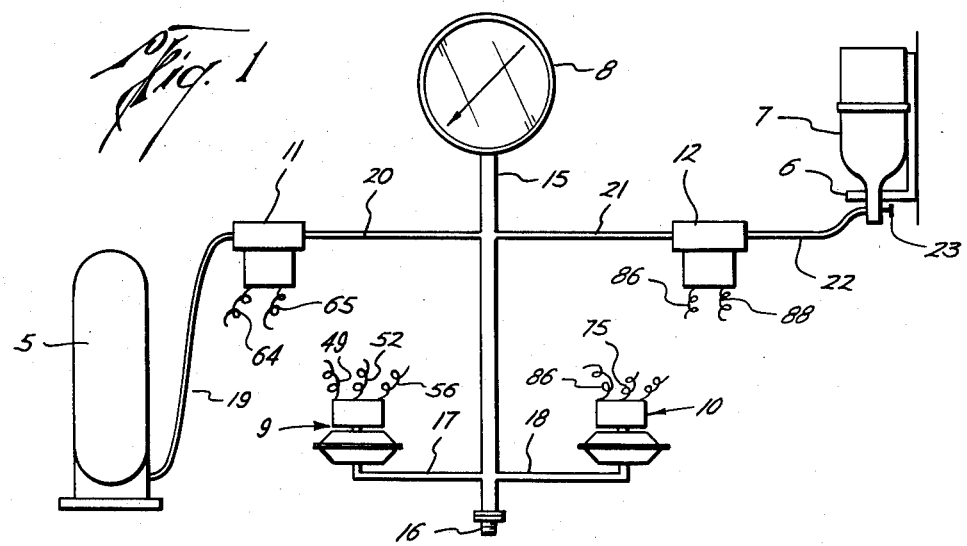
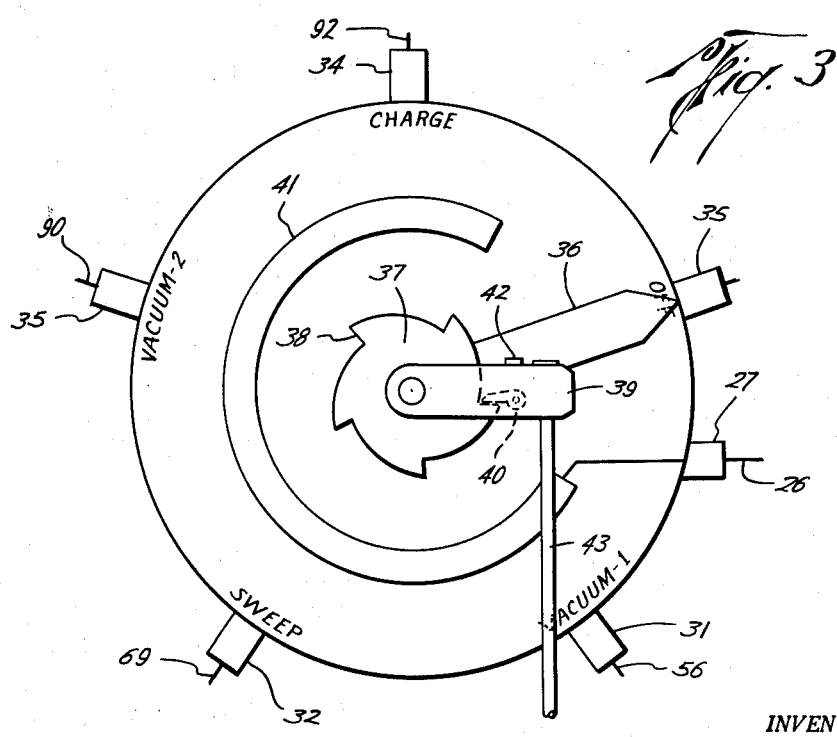
INVENTOR.
Louis B. White
BY
Bertram H. Mann
ATTORNEY Feb. 5, 1963   L. B. WHITE   3,076,319
REFRIGERATION CHARGING APPARATUS
Filed Feb. 13, 1961   2 Sheets-Sheet 2
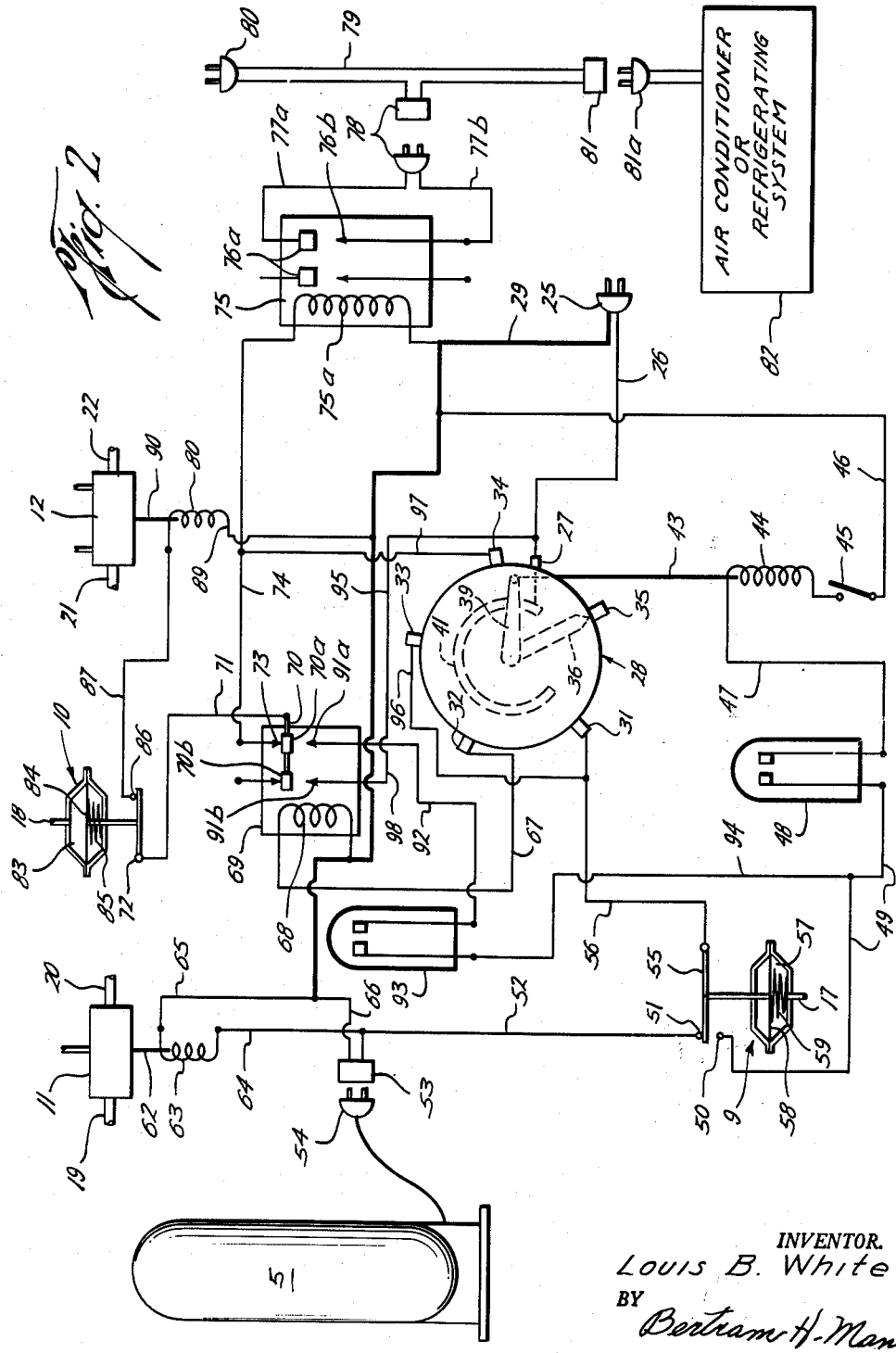
INVENTOR.
Louis B. White
BY Bertram H. Manns
ATTORNEY United States Patent Office
3,076,319
Patented Feb. 5, 1963

3,076,319
REFRIGERATION CHARGING APPARATUS
Louis B. White, Houston, Tex., assignor to Phil Rich Fan Manufacturing Company, Inc., Houston, Tex., a corporation of Texas
Filed Feb. 13, 1961, Ser. No. 89,035
9 Claims. (Cl. 62—149)

This invention relates to charging apparatus for refrigeration systems and consists particularly in a novel machine which, after being connected to the system to be charged, will automatically and safely perform all of the necessary charging steps without requiring the constant attention of a service mechanic.

Refrigeration charging equipment heretofore available has required the exercise of considerable skill and the substantially constant attendance of the operator in evacuating the system of all contaminants, injecting in the system the proper quantity of refrigerant, then removing the charging apparatus and initiating normal operation of the system. Since many hours may be required in properly effecting both the evacuation and recharging of the system, the constant attendance of the mechanic during such period, for instance in checking gauges and manipulating valves, prevents his undertaking additional jobs during such period, even though much of the time is utilized merely in waiting. Furthermore, the mechanic must carefully check the system and equipment from time to time, not only to insure complete evacuation and recharging of the system, but to prevent the recharging of a system having leaks, with consequent wastage of the refrigerant and the likelihood that the system will soon fail again.

Consequently, it is an important object of the present invention to provide an automatic charging apparatus for refrigerating and air conditioning systems which requires the presence of the mechanic only in initially adjusting the apparatus and attaching it to the refrigerating system to be charged, then, at any time after the charging interval, removing the apparatus from the system.

Another object is to provide refrigerant charging apparatus which performs the necessary sequential steps in effecting a proper charging, only if the preceding evacuation step has been properly completed.

Another object is to provide an automatic charging apparatus for refrigerating systems which will cause the system to be properly charged and to begin normal operation without the necessity of the apparatus being removed or manually cut off.

Still another object of the invention is to provide an automatic charging apparatus of the class described which may be left connected to the system being charged for an indefinite period while the service mechanic performs other jobs.

These objects and other more detailed objects are attained by the apparatus illustrated in the accompanying drawings, in which FIG. 1 is a largely diagrammatic view illustrating the various parts of the apparatus and their piping connections.

FIG. 2 is a wiring diagram of the apparatus showing the functional parts of certain of the constituents in greater detail.

FIG. 3 is an enlarged detail showing the stepper switch or relay.

Illustrated in FIG. 1 are a vacuum pump 5 having an actuating motor (not shown), a suitable mount 6 for a vessel 7 containing refrigerant under pressure, a compound vacuum-pressure gauge 8, vacuum and pressure controlled devices 9 and 10, and vacuum and pressure control valves 11 and 12. A central pipe or manifold 15 has a fitting 16 for application to the charging port of the refrigerating system or unit. Branch tubes 17 and 18 lead, respectively, to vacuum and pressure controls 9 and 10, tubing 19, 20 connects vacuum pump 5, through valve 11, to central tube 15, and tubing 21, 22 connects refrigerant vessel 7, through pressure valve 12, to the central tubing. The refrigerant container is provided with a dispensing valve 23.

With reference to FIG. 2, a plug 25 for connection to a suitable source of power, say 110 volt current, as ordinarily provided in homes, has a wire 26 leading to a power terminal 27 of a stepper type switch, generally indicated at 28, and a common return wire 29. Stepper switch 28, as better shown in FIG. 3, has a series of five output terminals, designated 31—35, inclusive, which are selectively connected with power terminal 27 by a rotating contactor or bridging arm 36 which is operated step by step by a central rotor element 37 having ratchet teeth 38, an arm 39 carrying a pivoted detent 40, and a knob (not shown) for manual actuation. Terminals 31—35 correspond respectively with positions of bridging arm 36 marked "vacuum–1," "sweep," "vacuum–2," "charge," and "off." A curved contactor strip 41 is electrically connected to power input terminal 27. Arm 39 is constantly urged, as by a spring (not shown), toward the position shown against a stop 42 and may be rotated clockwise by a link 43 acting through ratchet elements 39, 40, and 37. As will be obvious, each clockwise rotation of arm 39 causes central element 37 and the carried switch arm to move sequentially between output terminals 31—35, inclusive.

Link 43 is connected to the armature of a stepping solenoid coil 44 which is connected through a master control manual switch 45 and wire 46 to return wire 29. The other terminal of the solenoid is connected by a wire 47 to one terminal of a thermal delay switch 48 whose contacts are normally open, as shown. This switch is of the type in which current is initially applied to a resistance unit which, after a predetermined delay, causes the switch points to close. The other terminal of the thermal switch 48 is connected by a wire 49 to a normally open contact 50 of vacuum sensitive control 9. The normally closed contact 51 of the vacuum control is connected by a wire 52 to the female element 53 of a plug for connection through mating plug element 54 to the driving motor (not shown) of vacuum pump 5. The movable blade 55 of vacuum control 9 is connected by means of wire 56 to output terminal 31 of the step by step switch marked "vacuum–1." Vacuum control device 9 includes a chamber 57 which may be connected to the refrigerating system to be charged by means of tubing 17, 15 and which is closed on one side by a diaphragm 58 constantly urged by a spring 59 in an outward direction so as to cause switch blade 55 normally to contact output terminal 51.

Vacuum valve 11 includes an actuating stem 62 which is connected to the armature of a solenoid 63. One wire 64 of the solenoid constitutes a branch of previously-mentioned wire 52 extending from output contact 51 of the vacuum control. The other wire 65 from the solenoid 63 connects with return wire 29, as does the second wire 66 from plug element 53.

Output terminal 32 of the stepper relay, marked "sweep," is connected by means of a wire 67 to one connection of the magnetic coil 68 of a relay, generally designated 69. The bar 70 of this relay carrying movable contacts 70a and 70b, is connected by a wire 71 to the blade 72 of pressure control device 10. One normally closed terminal 73 of relay 69 is connected by a wire 74 to the coil 75a of a relay 75. Movable and stationary contacts 76a and 76b of relay 75 are connected by means of wires 77a and 77b, plug elements 78, wiring harness 79, and plug elements 80, 81, and 81a with the air conditioning or refrigeration system 82 to be charged and the usual source of power therefor.

The pressure controlled device 10 includes a chamber 83 communicating through tubing 18 with central tube 15. One side of this chamber is closed by a diaphragm 84 urged by a spring 85 in the direction to normally close contact 86, connected by a wire 87 to one terminal of a solenoid 88, the other terminal 89 of which is connected to the common return 29. Charging valve 12 has an actuating stem 90 connected to the armature of solenoid 88.

One normally open contact 91a of relay 69 is connected by a wire 92 to one terminal of a second thermal delay switch 93. The other terminal of switch 93 is connected by a wire 94 to previously mentioned wire 49 leading to first delay switch 48. The other normally open relay point 91b is connected by a wire 95 to current input terminal 27 of the stepper relay.

Output terminal 33 of the stepper switch marked "vacuum-2" is connected by a jumper wire 96 and wire 56 to previously-mentioned stepper switch terminal 31 so that when the stepper switch is in position to apply current to its terminal 33, this current will be connected to the vacuum pump motor.

Output terminal 34 of the stepper switch is connected by a wire 97 and previously mentioned wire 74 to normally closed contact 73 of relay 69 for directing current therethrough and through wire 71 to pressure control 10.

The apparatus operates as follows: When a refrigerating system 82 is to be charged, its powering plug 81a is connected to plug element 81, plug element 80 is connected to the usual powering source for the compressor, and the manual control switch for the system to be charged is turned "on." Vacuum and pressure controlled devices 9 and 10 are set in accordance with predetermined standards for the particular system. Plug parts 78 are connected, fitting 16 is connected to the charging port of the system, the manual control switch 45 of the charging machine is turned on, and stepper switch blade 36 is moved, by means of its knob (not shown) from the "off" position to the position marked "vacuum-1." If the suction or negative difference of pressure between atmosphere and that existing in the refrigerating system is less than a predetermined value and insufficient to actuate control diaphragm 58 of suction device 9, electrical energy will be led from stepper switch point 31 through vacuum control contact 51 and wire 52 to the vacuum pump motor causing operation of the pump. At the same time, electrical energy is led through wire 64 and solenoid 63, causing opening of vacuum valve 11 and consequent initial or rough evacuation of the refrigerating system through piping 19, 20 and 15.

When the depression or "vacuum" in the system is sufficient to actuate diaphragm 58, switch blade 55 moves away from contact 51, thus de-energizing the vacuum pump motor, and engages the contact 50 which directs energy through wire 49 to thermal delay switch 48. When the switch 48 is heated sufficiently to close, energy is led to solenoid 44 which acts through link 43 to rotate stepper switch blade 39 one step so as to cut off terminal 31 and direct electrical energy to terminal 32. This energy is then led through wire 67 to the holding coil 68 of relay 69, shifting relay contact 70a into contact with terminal 91a. Current is now directed from wire 95 through relay contacts 91b and 70b, bar 70, and wire 71 to pressure sensitive control 10. If pressure in the system being charged is below a predetermined value insufficient to actuate control diaphragm 84 against its spring 85, as, of course, it will be under normal circumstances, current will be continued through normally closed contact 86 and wire 87 to solenoid 88 for opening charge valve 12. This will permit the introduction of refrigerant from vessel 7 through piping 22, 21 and 15 into the system.

Energization of relay 69 also causes the application of electrical energy through relay contacts 70a and 91a and wire 92 to thermal delay switch 93. After the interval for which delay switch 93 is set, this switch will close, causing the supply of electrical energy to the other delay switch 48 which, in turn after its calibrated interval, will direct the current to solenoid 44 to again actuate the stepper switch, cutting off charging terminal 32 and applying electrical energy to "vacuum" terminal 33. This interval, during closing of both delay switches, is sufficient to apply a "sweeping charge" to the system which, due to the affinity of certain refrigerants for moisture, has the effect of absorbing such moisture as may remain in the system after the first evacuation step.

When energy is supplied to stepper terminal 33, the vacuum pump is again actuated through wires 96, 56, 52, etc. until the depression in the system is again sufficient to actuate vacuum control diaphragm 58, whereupon the vacuum pump is again cut off and current is again led through terminal 50 and delay switch 48 to stepper switch actuating solenoid 44. This shifts the stepper switch to cut off "vacuum" terminal 33 and apply energy to final "charge" terminal 34. This energy is led through wires 97 and 74, relay point 73 and bar 70, and wire 71 to the pressure sensitive control 10. Thence, energy is led, as before, through blade 72, contact 86, and wire 87 to solenoid 88 for reopening charging valve 12. Refrigerant from vessel 7 again flows to the system being charged until the pressure therein is sufficient to actuate pressure controlled diaphragm 84 and open switch contact 86. This permits normally closed charging valve 12 to close, cutting off the supply of refrigerant to the system.

When stepper switch terminal 34 is energized, electrical energy is also supplied through wires 97 and 74 to actuate relay 75 and supply current to the compressor motor of the system being charged, which in effect, initiates normal operation of the system. Thus, when the refrigerant in the system reaches the predetermined optimum pressure, as sensed by pressure sensitive control 10, the charging apparatus is, in effect, functionally cut off completely from the system and the latter then continues to operate indefinitely in its normal manner. It is only necessary for the service mechanic, at his convenience, to disconnect the charging apparatus from the system which may be many hours or even days after the apparatus was first connected to the system and rotate stepper switch arm 36 to its "off position."

The thermal delay switch 48, in addition to timing the introduction of the sweeping charge during the second step operation of the stepper switch, also functions to prevent the introduction of the sweeping charge and, incidentally, the continuation of the charging cycle, in case of a leak in the system being charged. Thus, in position 31 of the stepper switch, the pressure in the system is brought down to a predetermined point before actuation of vacuum control 9 to transfer electrical energy from terminal 51 to terminal 50 and, through wire 49 and delay switch 48 to stepper switch actuating relay 44. If, however, during the interval before thermal switch 48 closes, the depression in the system is partly lost, due to a leak, vacuum control diaphragm 58 will be actuated by its spring 59 to open switch contact 50 and thus cut off the supply of electrical energy which, otherwise, when delay switch 48 closes, would cause shifting of the stepper relay to energize sweep charge terminal 32. In such situation, the refrigerant could not be wasted by being introduced into the leaking refrigerating system.

This condition also could be observed from the compound pressure and vacuum gauge 8 by the fact that the maximum vacuum reading would drop even before the charging valve is opened. Likewise, the complete cycle, including initial depression, determination of the sweeping charge period, the second evacuating step, and the final charging step may be determined by observation of the gauge and, in fact, the various charging and evacuating steps can be achieved manually by manual operation of stepper switch rotor 37 through its knob. To permit complete manual operation of the system, it is simply necessary to open the manual control switch 45.

The various components of the system are schematically represented and of course may be altered within the skill of electrical and pneumatic or hydraulic control technicians. Furthermore, other types of controls, such as hydraulic or pneumatic and other electrical controls, for instance cam and follower timing means, may be substituted for the electrical controls. Furthermore, the steps achieved in automatic or manual operation may be varied or increased, as required.

The exclusive use of all modifications as come within the scope of the appended claims is contemplated.

I claim:

1. Apparatus for charging a refrigeration system comprising system evacuating and charging devices, ducts for connecting said devices to the system, control valves in said ducts, pressure sensing means communicating with said ducts, actuating means for said valves, timing means, and means operatively interconnecting said pressure sensing, valve actuating, and timing means for causing automatic sequential evacuation of the connected refrigeration system, provided the pressure in the system is above a first predetermined value, charging of the system with refrigerant when the system pressure reaches said value, and cutting off said ducts from the system when the pressure therein reaches a second predetermined value, said timing means including a part for signalling the passage of a predetermined time interval and being constructed and arranged to cause actuation of at least one of said valves when the system reaches said first predetermined pressure value, for introducing a sweeping charge into the system during said time interval, and to automatically reconnect said evacuating device to the system following said interval.

2. Apparatus for charging a mechanical refrigerating system comprising means for connecting the system being charged to the apparatus, a vacuum pump and a source of refrigerant under pressure, ducts for individually connecting said pump and said source to said means, an electrical connection for powering the system being charged, a switch for controlling said connection and an actuator for said switch, vacuum and pressure sensing devices communicating, respectively, with said ducts, control valves in said ducts, actuators for said valves, a step-by-step timer having power input and outlet connections, the latter being individually connected to said pump and said valve actuators, an actuator for said timer, and operating connections between said timer, said pressure sensitive device, said pump, said valves, and said timer and switch actuators for sequentially operating said pump and opening the corresponding duct control valve to evacuate the system, stopping said pump while closing its duct valve and opening the charge control duct valve to sweep out the system, closing the charge control duct valve and reopening the vacuum control valve to again evacuate the system, reclosing the vacuum control duct valve and reopening the charge control duct valve to supply a working charge to the system, closing said switch for initiating normal operation of the unit being tested, and closing the charge control valve to functionally segregate the apparatus from the system being charged.

3. Apparatus as described in claim 2 further including a time delay device and a lower pressure sensing device interposed in the operative connection between said timer and said charge control valve to delay opening of said latter valve during a time interval whereby change of pressure in the system during said interval, due to a leak in the system, will affect said pressure sensing device and thereby prevent opening of said charge control valve.

4. Apparatus as described in claim 2 in which said timer is provided with a pair of charging outlet connections, one of said connections having a connection to said timer actuator, and a time delay device interposed in said latter connection for delaying shifting of said timer and maintaining said charge control valve open only during a predetermined time interval for supplying a limited sweeping charge to the system.

5. Charging apparatus as described in claim 2 in which said pressure sensing device is operatively connected to said connecting means for registering pressure conditions therein and in a refrigerating system being charged, one of said valves controlling the supply duct between said refrigerant source and said connecting means and being controlled by said pressure sensing device for closing said supply duct to end the charging operation when the system being charged reaches optimum pressure.

6. Apparatus for charging a mechanical refrigerator comprising a manifold arranged for fluid connection to the unit to be charged, suction and pressure responsive switches operatively connected to said manifold for registering pressure conditions therein and in a connected unit, a suction pump and a refrigerant source having individual connections with said manifold, suction and charging valves with control motors respectively in said connections, a stepping switch with a stepping coil and first and second contacts, a source of power, wiring connecting said power source and said first contact through said suction responsive switch selectively to said pump and said stepping coil for energizing said pump when less than predetermined suction exists in said manifold and for stopping said pump and shifting said stepping switch to said second contact when said predetermined suction is attained in said manifold, and wiring connecting said power source and said second contact through said pressure responsive switch with said charging valve motor for opening said charging valve when less than predetermined pressure exists in said manifold and closing said valve to cut off the apparatus from a unit being charged when said pressure is attained in said manifold.

7. Charging apparatus as described in claim 6 further including a relay having an actuating coil connected between said second contact and said source of power and means for connecting said latter contact to said source of power and the unit operating motor whereby shifting of said stepping switch to said second contact initiates normal operation of the unit being charged.

8. Charging apparatus as described in claim 6 in which said stepping switch includes third and fourth contacts successively in advance of said first and second contacts, wiring connecting said power source and said third contact through said suction switch selectively to said suction pump and said stepping coil for initially evacuating said manifold and the connected unit and stopping said pump and shifting said stepping switch to said fourth contact when predetermined suction is attained in said manifold, wiring connecting said power source to said fourth contact and said charging valve, and timing means included in said last mentioned wiring for causing injection of a limited sweeping charge into said manifold and the unit and, thereafter, shifting said stepping switch to said first contact.

9. Charging apparatus as described in claim 6 further including timing means connected in the wiring between said suction switch and said stepping coil for delaying energization of said stepping coil for an interval after said pump is stopped whereby leakage in the apparatus or connected unit will cause opening of said suction switch and thereby prevent opening of said charging valve through said second stepping switch contact.

References Cited in the file of this patent

UNITED STATES PATENTS 2,499,170    Shoemaker _____ Feb. 28, 1950